United States Patent
Mohlman

(10) Patent No.: US 10,439,381 B1
(45) Date of Patent: Oct. 8, 2019

(54) ELECTRICAL RACEWAY SYSTEM AND ASSOCIATED WIRE BUNDLE CLAMP SYSTEM AND METHOD

(71) Applicant: The Boeing Company, Chicago, IL (US)

(72) Inventor: Shawn D. Mohlman, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/031,487

(22) Filed: Jul. 10, 2018

(51) Int. Cl.
*H02G 3/32* (2006.01)
*H02G 3/04* (2006.01)

(52) U.S. Cl.
CPC ............. *H02G 3/32* (2013.01); *H02G 3/0406* (2013.01); *H02G 3/0437* (2013.01); *B64D 2221/00* (2013.01)

(58) Field of Classification Search
USPC .......................................... 248/49; 174/72 A
See application file for complete search history.

(56) References Cited

U.S. PATENT DOCUMENTS

| | | | | |
|---|---|---|---|---|
| 2,232,602 A | * | 2/1941 | Grace | H01R 4/363 174/88 S |
| 2,354,919 A | * | 8/1944 | Lockwood | F16L 3/2235 248/68.1 |
| 2,375,513 A | * | 5/1945 | Bach | F16L 3/221 248/59 |
| 2,387,951 A | * | 10/1945 | Slater | F16L 3/227 248/68.1 |
| 3,082,984 A | * | 3/1963 | Larsson | F16L 3/13 174/72 A |
| 3,210,716 A | * | 10/1965 | Meacham | H02B 1/21 174/171 |
| 3,226,069 A | * | 12/1965 | Clarke | F16L 3/227 24/282 |
| 3,335,399 A | * | 8/1967 | Rys | H01H 1/5855 439/739 |
| 3,473,768 A | * | 10/1969 | Piasecki | F16B 21/088 24/16 PB |
| 3,501,117 A | * | 3/1970 | Soltysik | F16L 3/13 24/339 |
| 3,551,876 A | * | 12/1970 | Walter | H01R 9/2675 439/110 |

(Continued)

*Primary Examiner* — William H. Mayo, III
*Assistant Examiner* — Krystal Robinson
(74) *Attorney, Agent, or Firm* — Kunzler Bean & Adamson

(57) ABSTRACT

Disclosed herein is a clamp system for affixing at least one wire bundle, having any one of various sizes, to a rail elongated in a lateral direction. The clamp system comprises a first clamping component comprising a first concave engagement surface and configured for fixed attachment to the rail. The clamp system also comprises a second clamping component comprising a second concave engagement surface and configured for slidable attachment to the rail. When the first clamping component and the second clamping component are attached to the rail, the first concave engagement surface and the second concave engagement surface oppose and face each other to enable capture of the wire bundle therebetween and a distance between the first concave engagement surface and the second concave engagement surface is adjustable.

21 Claims, 9 Drawing Sheets

(56) References Cited

U.S. PATENT DOCUMENTS

| | | | | |
|---|---|---|---|---|
| 3,632,070 A * | 1/1972 | Thayer | F16L 3/233 | 24/16 PB |
| 3,650,499 A * | 3/1972 | Biggane | F16L 3/227 | 248/62 |
| 3,727,171 A * | 4/1973 | Coles | H01R 4/34 | 439/110 |
| 3,739,429 A * | 6/1973 | Kohke | B65D 63/1054 | 24/16 PB |
| 3,916,089 A * | 10/1975 | Sloan | B60M 1/34 | 174/164 |
| 3,946,877 A * | 3/1976 | Galicia | A47K 1/09 | 211/65 |
| 3,968,323 A * | 7/1976 | Blanchet | F16L 3/227 | 174/135 |
| 3,986,695 A * | 10/1976 | Hronas | A47F 7/285 | 248/222.51 |
| 4,023,758 A * | 5/1977 | Yuda | H02G 3/32 | 248/73 |
| 4,032,096 A * | 6/1977 | Perrault | F16L 3/08 | 248/220.21 |
| 4,211,381 A * | 7/1980 | Heard | G09F 7/18 | 248/225.11 |
| 4,244,544 A * | 1/1981 | Kornat | F16L 3/13 | 248/68.1 |
| 4,337,934 A * | 7/1982 | Caveney | B65B 13/18 | 248/68.1 |
| D269,851 S * | 7/1983 | Kimura | D8/356 | |
| 4,437,633 A * | 3/1984 | Andre | B60R 16/0215 | 248/68.1 |
| 4,579,310 A * | 4/1986 | Wells | H04M 1/0293 | 248/544 |
| 4,640,571 A * | 2/1987 | Walter | H01R 4/366 | 439/791 |
| 4,778,412 A * | 10/1988 | Walter | H01R 25/142 | 439/798 |
| 4,907,767 A * | 3/1990 | Corsi | H02G 3/0418 | 138/162 |
| 4,961,553 A * | 10/1990 | Todd | F16B 37/045 | 248/62 |
| 5,021,014 A * | 6/1991 | Walter | H01R 4/363 | 439/798 |
| 5,126,507 A * | 6/1992 | Kirma | H05K 9/00 | 138/108 |
| 5,150,865 A * | 9/1992 | Miller | F16B 21/088 | 248/220.41 |
| 5,274,194 A * | 12/1993 | Belcher | H02G 3/0418 | 174/50 |
| 5,337,983 A * | 8/1994 | Mailey | F16L 3/137 | 248/68.1 |
| 5,354,021 A * | 10/1994 | Farrell | F16L 3/233 | 24/16 PB |
| 5,399,812 A * | 3/1995 | Woszczyna | B60R 16/0215 | 138/115 |
| 5,463,189 A * | 10/1995 | Deneke | H02G 3/26 | 174/138 G |
| 5,593,115 A * | 1/1997 | Lewis | F16L 3/227 | 248/200.1 |
| D379,060 S * | 5/1997 | Laga | D8/373 | |
| 5,752,682 A * | 5/1998 | Anderson | H02G 3/26 | 248/316.7 |
| 5,775,956 A * | 7/1998 | Sticker | H01R 9/2416 | 174/72 A |
| 5,792,992 A * | 8/1998 | Handler | H02G 3/0431 | 174/101 |
| 5,848,771 A * | 12/1998 | Hancock-Bogese | F16L 3/233 | 248/74.3 |
| 5,855,342 A * | 1/1999 | Hawkins | F16L 3/24 | 248/55 |
| 5,876,000 A * | 3/1999 | Ismert | E03C 1/021 | 248/65 |
| 6,109,569 A * | 8/2000 | Sakaida | F16L 3/222 | 248/316.7 |
| 6,127,631 A * | 10/2000 | Green | H04Q 1/06 | 174/135 |
| 6,212,742 B1 * | 4/2001 | Baskin | F16L 3/1058 | 24/16 PB |
| 6,220,554 B1 * | 4/2001 | Daoud | F16L 3/12 | 24/16 PB |
| 6,234,277 B1 * | 5/2001 | Kaczmarek | B66B 7/06 | 174/42 |
| 6,513,764 B2 * | 2/2003 | Koziol | F16L 3/04 | 248/49 |
| D506,385 S * | 6/2005 | Brown | D8/394 | |
| 7,028,962 B1 * | 4/2006 | Hostetler | B63B 17/00 | 211/75 |
| 7,381,899 B2 * | 6/2008 | Pfluger | H02G 3/32 | 174/92 |
| 7,490,727 B2 * | 2/2009 | Spiers | A47F 7/0028 | 211/70.6 |
| 7,530,536 B2 * | 5/2009 | Hashimoto | F16L 3/2235 | 211/59.4 |
| 7,608,782 B2 * | 10/2009 | Hill | H01R 4/48 | 174/84 C |
| 7,661,634 B2 * | 2/2010 | Thompson | B65D 63/1072 | 24/274 R |
| 7,922,130 B2 * | 4/2011 | Hawkins | F16L 3/00 | 248/346.01 |
| 8,011,520 B2 * | 9/2011 | Spiers | A47F 7/285 | 211/75 |
| 8,290,330 B2 * | 10/2012 | Taylor | H04Q 1/131 | 385/134 |
| 8,517,186 B1 * | 8/2013 | McCoy | H02G 3/263 | 211/193 |
| 8,714,495 B2 * | 5/2014 | Myers | F16B 2/12 | 248/74.1 |
| 8,840,162 B1 * | 9/2014 | Williams | B65H 75/366 | 294/143 |
| 9,546,744 B2 * | 1/2017 | Patil | F16L 3/24 | |
| 9,671,046 B2 * | 6/2017 | Whipple | F16L 3/233 | |
| D831,743 S * | 10/2018 | Prince | D19/105 | |
| 2002/0000498 A1 * | 1/2002 | Workman | F16L 3/24 | 248/62 |
| 2004/0216911 A1 * | 11/2004 | Franz | H02B 1/202 | 174/72 A |
| 2007/0007397 A1 * | 1/2007 | Nelson | F16L 3/2235 | 248/68.1 |
| 2007/0080265 A1 * | 4/2007 | Schaffer | F16L 3/1025 | 248/65 |
| 2007/0251714 A1 * | 11/2007 | Winkelbach | H02G 3/045 | 174/71 R |
| 2009/0026318 A1 * | 1/2009 | Gross | B64D 11/003 | 244/131 |
| 2014/0097304 A1 * | 4/2014 | Mastro | F16L 3/24 | 248/73 |
| 2015/0294768 A1 * | 10/2015 | Sakaki | B60R 16/0207 | 174/68.3 |
| 2016/0121822 A1 * | 5/2016 | Shaw | B60R 16/0215 | 248/74.3 |
| 2016/0365177 A1 * | 12/2016 | Mohlman | B62B 1/264 | |

\* cited by examiner

ELECTRICAL RACEWAY SYSTEM AND ASSOCIATED WIRE BUNDLE CLAMP SYSTEM AND METHOD

FIELD

This disclosure relates generally to electrical raceway systems, and more particularly to clamp systems for an electrical raceway system of an aircraft.

BACKGROUND

Electrical raceway systems for aircraft help to affix bundles of wires along a fuselage of the aircraft. Conventional electrical raceway systems employ various types of retention devices that capture and retain a bundle of wire. However, adjusting conventional retention devices to accommodate differently sized bundles of wires, particularly on the fly during assembly of the aircraft, can be difficult if not impossible.

SUMMARY

The subject matter of the present application has been developed in response to the present state of the art, and in particular, in response to the shortcomings of electrical raceway systems of aircraft, or other vehicles or structures, that have not yet been fully solved by currently available techniques. Accordingly, the subject matter of the present application has been developed to provide an electrical raceway system and associated method that overcome at least some of the above-discussed shortcomings of prior art techniques.

Disclosed herein is a clamp system for affixing at least one wire bundle, having any one of various sizes, to a rail elongated in a lateral direction. The clamp system comprises a first clamping component comprising a first concave engagement surface and configured for fixed attachment to the rail. The clamp system also comprises a second clamping component comprising a second concave engagement surface and configured for slidable attachment to the rail. When the first clamping component and the second clamping component are attached to the rail, the first concave engagement surface and the second concave engagement surface oppose and face each other to enable capture of the wire bundle therebetween and a distance between the first concave engagement surface and the second concave engagement surface is adjustable. The preceding subject matter of this paragraph characterizes example 1 of the present disclosure.

The rail comprises holes spaced apart in the lateral direction. The first clamping component comprises a nub engageable with a corresponding one of the holes to prevent movement of the first clamping component relative to the rail in the lateral direction. The preceding subject matter of this paragraph characterizes example 2 of the present disclosure, wherein example 2 also includes the subject matter according to example 1, above.

The first clamping component comprises arms spaced apart from each other and configured to releasably engage the rail therebetween to constrain movement of the first clamping component relative to the rail in an upright direction perpendicular to the lateral direction. The preceding subject matter of this paragraph characterizes example 3 of the present disclosure, wherein example 3 also includes the subject matter according to example 2, above.

Slidable attachment of the second clamping component to the rail promotes sliding of the second clamping component along the rail in the lateral direction. The second clamping component comprises arms spaced apart from each other and configured to releasably engage the rail therebetween to constrain movement of the second clamping component relative to the rail in an upright direction perpendicular to the lateral direction. The preceding subject matter of this paragraph characterizes example 4 of the present disclosure, wherein example 4 also includes the subject matter according to any of examples 2-3, above.

The first clamping component comprises two first concave engagement surfaces facing opposite directions. The preceding subject matter of this paragraph characterizes example 5 of the present disclosure, wherein example 5 also includes the subject matter according to any one of examples 1-4, above.

The clamp system further comprises a flexible retention strap engageable with the first clamping component, the second clamping component, and the wire bundle to at least partially affix the wire bundle to the first clamping component and the second clamping component. The preceding subject matter of this paragraph characterizes example 6 of the present disclosure, wherein example 6 also includes the subject matter according to any one of examples 1-5, above.

Engagement between the flexible retention strap and the first clamping component and the second clamping component constrains movement of the second clamping component away from the first clamping component in the lateral direction. The preceding subject matter of this paragraph characterizes example 7 of the present disclosure, wherein example 7 also includes the subject matter according to example 6, above.

One of the first clamping component or the second clamping component comprises a ratcheting mechanism integrated into the one of the first clamping component or the second clamping component. The ratcheting mechanism is configured to engage the flexible retention strap and allow motion of the flexible retention strap through the ratcheting mechanism in only one direction. The preceding subject matter of this paragraph characterizes example 8 of the present disclosure, wherein example 8 also includes the subject matter according to any one of examples 6-7, above.

The first clamping component comprises at least two apertures through which the flexible retention strap is extendable to couple the flexible retention strap to the first clamping component. The second clamping component comprises at least two apertures through which the flexible retention strap is extendable to couple the flexible retention strap to the second clamping component. The preceding subject matter of this paragraph characterizes example 9 of the present disclosure, wherein example 9 also includes the subject matter according to any one of examples 6-8, above.

The first clamping component further comprises a through-channel formed in the first clamping component and intercoupling the at least two aperture. The preceding subject matter of this paragraph characterizes example 10 of the present disclosure, wherein example 10 also includes the subject matter according to example 9, above.

One of the at least two apertures and the at least two aperture comprises a pocket configured to complementary engage a ratcheting mechanism of the flexible retention strap. The preceding subject matter of this paragraph characterizes example 11 of the present disclosure, wherein example 11 also includes the subject matter according to any one of examples 9-10, above.

Further disclosed herein is an electrical raceway system. The electrical raceway system comprises at least one rail elongated in a lateral direction. The electrical raceway system also comprises at least one wire bundle, comprising a plurality of wires, elongated in a longitudinal direction perpendicular to the lateral direction. The electrical raceway system further comprises at least one clamp system. The at least one clamp system comprises a first clamping component non-movably attached to the rail and comprising a first concave engagement surface. The at least one clamp system also comprises a second clamping component slidably attached to the rail and comprising a second concave engagement surface opposing and facing the first concave engagement surface, wherein the second clamping component is slidable along the rail in the lateral direction and the wire bundle is captured between the first concave engagement surface and the second concave engagement surface. The at least one clamp system further comprises a flexible retention strap engaged with the first clamping component, the second clamping component, and the wire bundle to at least partially affix the wire bundle to the first clamping component and the second clamping component and to constrain movement of the second clamping component away from the first clamping component in the lateral direction. The preceding subject matter of this paragraph characterizes example 12 of the present disclosure.

The electrical raceway system comprises a plurality of wire bundles and a plurality of clamp systems. Each clamp system captures a corresponding at least one of the plurality of wire bundles. The plurality of wire bundles are spaced apart in the lateral direction. The preceding subject matter of this paragraph characterizes example 13 of the present disclosure, wherein example 13 also includes the subject matter according to example 12, above.

A size of the first concave engagement surface and the second concave engagement surface of one of the plurality of clamp systems is different than another one of the plurality of clamp systems. The preceding subject matter of this paragraph characterizes example 14 of the present disclosure, wherein example 14 also includes the subject matter according to example 13, above.

The first clamping components of two adjacent clamp systems of the plurality of clamp systems are integrated together to form a one-piece monolithic construction. The first concave engagement surface of a first one of the first clamping components of the two adjacent clamp systems faces a direction opposite that of the first concave engagement surface of a second one of the first clamping components of the two adjacent clamp systems. The preceding subject matter of this paragraph characterizes example 15 of the present disclosure, wherein example 15 also includes the subject matter according to any one of examples 13-14, above.

The rail comprises holes spaced apart in the lateral direction. The first clamping component comprises a nub engaged with a corresponding one of the holes to prevent movement of the first clamping component relative to the rail in the lateral direction. The preceding subject matter of this paragraph characterizes example 16 of the present disclosure, wherein example 16 also includes the subject matter according to any one of examples 12-15, above.

The electrical raceway system comprises a plurality of rails spaced apart in the longitudinal direction. The electrical raceway system comprises a plurality of clamp systems each attached to a corresponding one of the plurality of rails. The at least one wire bundle is captured between the first concave engagement surface and the second concave engagement surface of each of the plurality of clamp systems. The preceding subject matter of this paragraph characterizes example 17 of the present disclosure, wherein example 17 also includes the subject matter according to any one of examples 12-16, above.

The electrical raceway system is configured for coupling to an aircraft between a floor of a passenger cabin of the aircraft and a cargo hold of the aircraft. The preceding subject matter of this paragraph characterizes example 18 of the present disclosure, wherein example 18 also includes the subject matter according to any one of examples 12-17, above.

Additionally disclosed herein is a method of affixing at least one wire bundle, elongated in a longitudinal direction, to a rail, elongated in a lateral direction. The method comprises non-movably attaching a first clamping component to the rail such that a first concave engagement surface of the first clamping component faces the lateral direction. The method also comprises slidably attaching a second clamping component to the rail such that a second concave engagement surface of the second clamping component faces the first concave engagement surface of the first clamping component. The method further comprises positioning at least one wire bundle of a first size between the first concave engagement surface and the second concave engagement surface. The method additionally comprises, with the at least one wire bundle of the first size between the first concave engagement surface and the second concave engagement surface, sliding the second clamping component along the rail toward the first clamping component to capture the at least one wire bundle of the first size between the first concave engagement surface and the second concave engagement surface. The method also comprises retaining the second clamping component relative to the first clamping component with a flexible retention strap. The preceding subject matter of this paragraph characterizes example 19 of the present disclosure.

The method further comprises removing the at least one wire bundle of the first size from between the first concave engagement surface and the second concave engagement surface. The method also comprises positioning at least one wire bundle of a second size, different than the first size, between the first concave engagement surface and the second concave engagement surface. The method additionally comprises, with the at least one wire bundle of the second size between the first concave engagement surface and the second concave engagement surface, sliding the second clamping component along the rail toward the first clamping component to capture the at least one wire bundle of the second size between the first concave engagement surface and the second concave engagement surface. The preceding subject matter of this paragraph characterizes example 20 of the present disclosure, wherein example 20 also includes the subject matter according to example 19, above.

The at least one wire bundle comprises a plurality of wire bundles. The method further comprises removing at least one of the plurality of wire bundles, but less than all of the plurality of wire bundles, from between the first concave engagement surface and the second concave engagement surface. The method further comprises sliding the second clamping component along the rail toward the first clamping component to capture the plurality of wire bundles less the at least one removed wire bundle between the first concave engagement surface and the second concave engagement surface. The preceding subject matter of this paragraph characterizes example 21 of the present disclosure, wherein example 21 also includes the subject matter according to any one of examples 19-20, above.

The method further comprises adding at least one additional wire bundle to the at least one wire bundle between the first concave engagement surface and the second concave engagement surface. The method also comprises sliding the second clamping component along the rail initially away from and then toward the first clamping component to capture the at least one wire bundle and the at least one additional wire bundle between the first concave engagement surface and the second concave engagement surface. The preceding subject matter of this paragraph characterizes example 22 of the present disclosure, wherein example 22 also includes the subject matter according to any one of examples 19-21, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
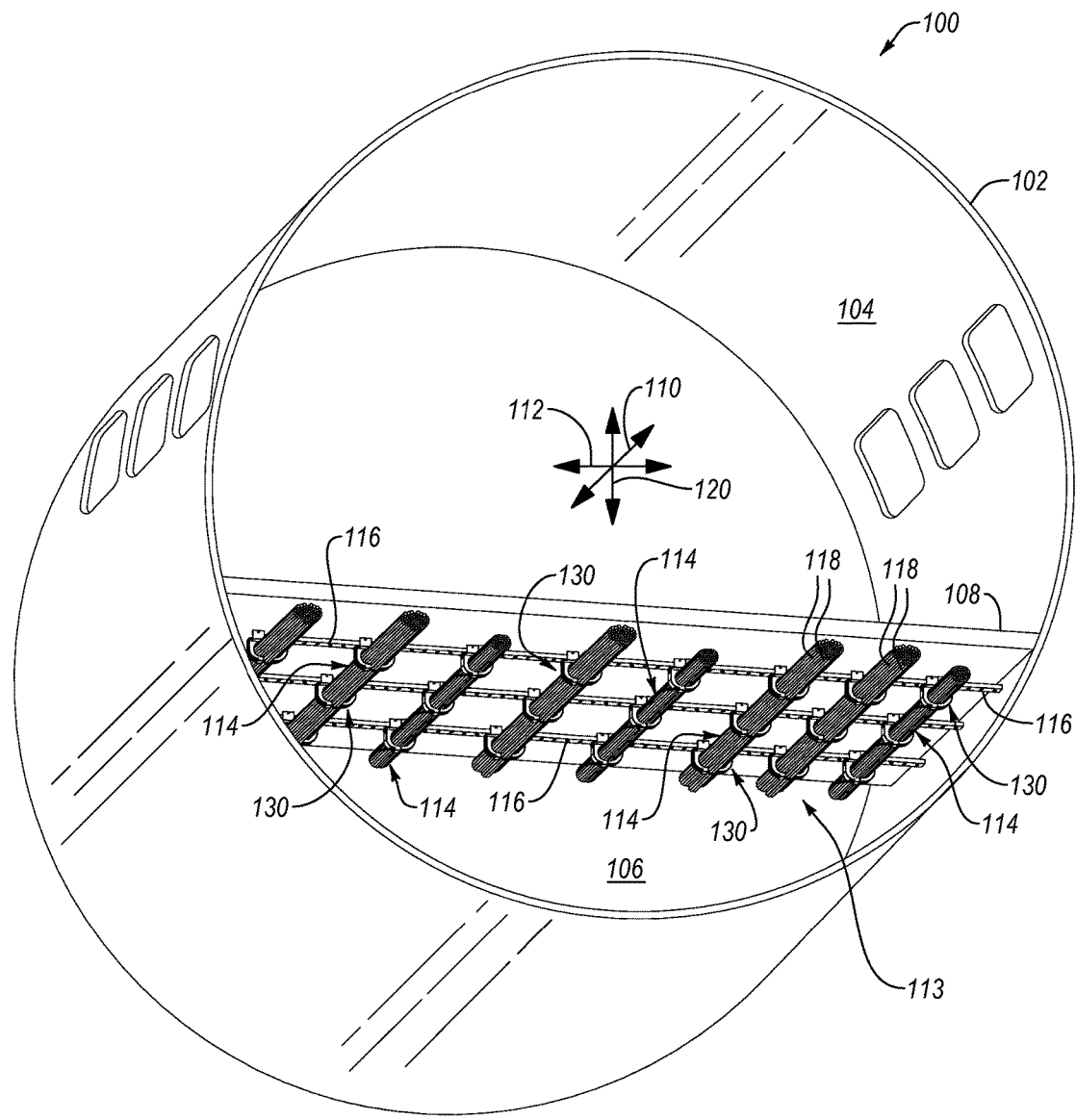
FIG. 1 is a cross-sectional perspective view of an aircraft with an electrical raceway system, according to one or more examples of the present disclosure.

Referring to FIG. 1, according to one example, an aircraft 100 includes a fuselage 102 that is generally elongated in a longitudinal direction 110. The aircraft 100 includes a floor 108 or partition that separates an interior space within the fuselage 102 into a passenger cabin 104 and a cargo hold 106. In some implementations, the passenger cabin 104 includes seats on which passengers can be seated during flight and overhead storage bins for storing smaller luggage and carry-on items. The cargo hold 106 is located beneath the passenger cabin 104 and can be used to store larger luggage and/or freight. In certain implementations, the cargo hold 106 includes an upper partition offset from the floor 108 such that a gap is defined between the floor 108 and the upper partition of the cargo hold 106. In one implementation, the gap is about two inches (25.4 mm). Although the aircraft 100 is depicted as a mass transit commercial aircraft, in other examples, the aircraft 100 can be a freighter designed to haul more freight and fewer (if any) passengers. Such freighter-style aircraft may also employ a floor 108 that separates the interior space into two separate cargo holds 106. The aircraft 100 of the present disclosure may also include other types of aircraft without departing from the essence of the present disclosure.

Figure 2:
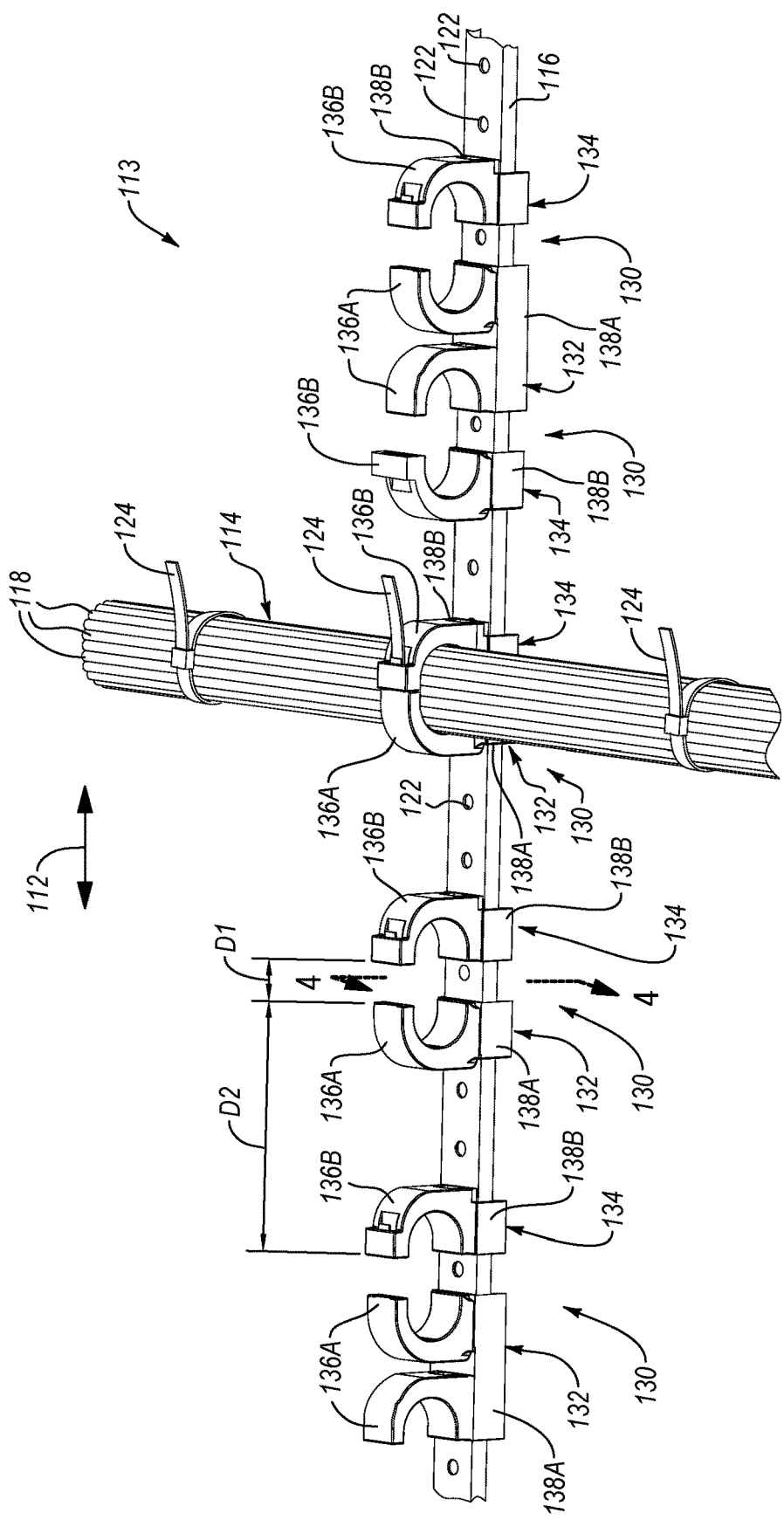
FIG. 2 is a perspective view of an electrical raceway system, according to one or more examples of the present disclosure.
Figure 5:
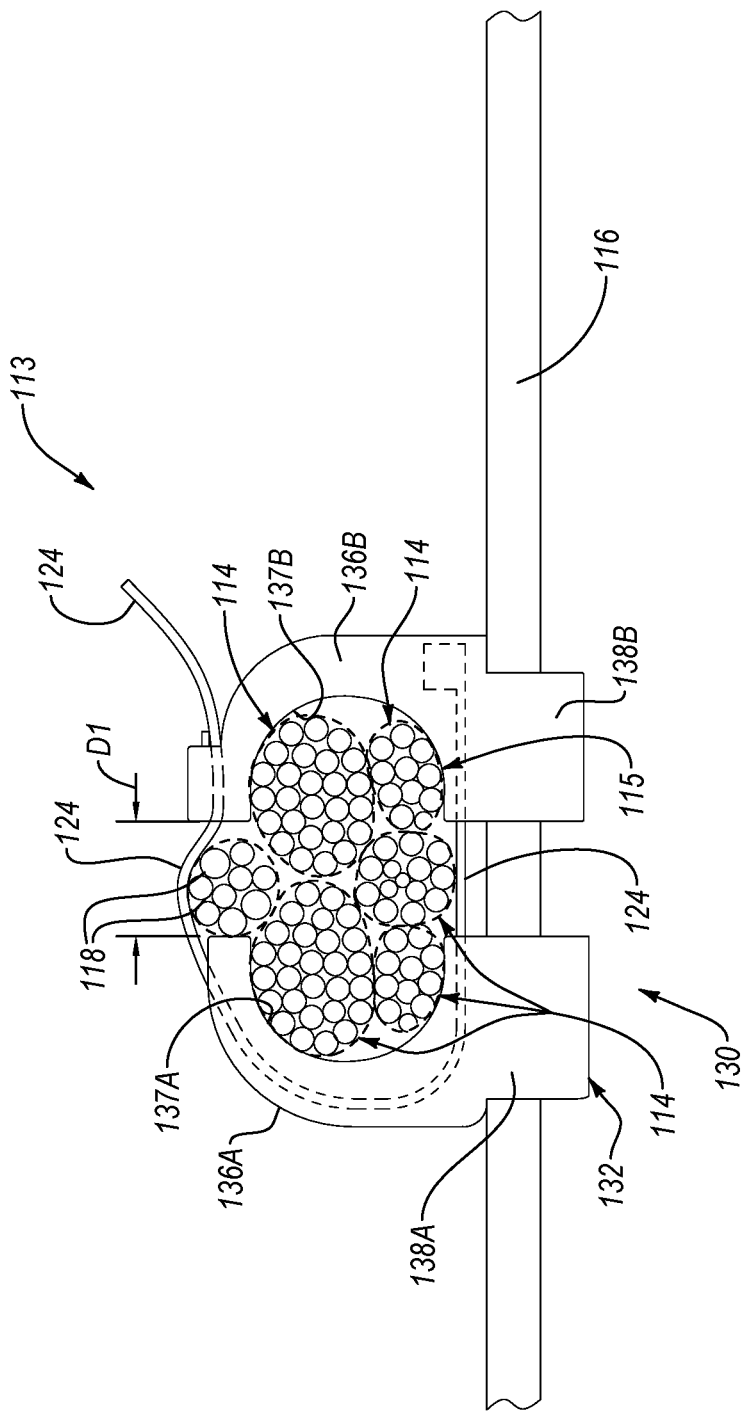
FIG. 5 is a front elevation view of the electrical raceway system of FIG. 3 with a wire bundle captured between a first clamping component and a second clamping component of the electrical raceway system, according to one or more examples of the present disclosure.

The aircraft 100 includes an electrical raceway system 113 within the fuselage 102. Although not shown, the aircraft 100 includes many electrical systems each receiving or providing electrical power and data signals via one or more wires 118. For convenience, organization, and spatial considerations, the wires 118 can be organized into wire bundles 114 each made up of one or more, fairly tightly packed, wires 118. The electrical raceway system 113 includes at least two wire bundles 114. As shown in FIG. 2, the wires 118 of a wire bundle 114 can be retained in a bundle shape by one or more flexible retention straps 124 wrapped around the wire bundle 114 at various locations along a length of the wire bundle 114. Although the wire bundles 114 can initiate and terminate at any of various locations along the fuselage 102, each wire bundle 114 is generally elongated in a direction parallel to the central axes of the wires 118 of the wire bundle 114. In the electrical raceway system 113, wire bundles 114 having the same separation characteristics may be grouped together to form a wire bundle grouping 115 (see, e.g., FIG. 5). In other words, each wire bundle grouping 115 includes a plurality of wire bundles 114 grouped together. The wires 118 of each wire bundle 114 can be arranged such that the wire bundle 114 has a generally defined cross-sectional shape. Additionally, the wire bundles 114 of a wire bundle grouping 115 can be arranged such that the wire bundle grouping 115 has a generally defined cross-sectional shape. In one implementation, a wire bundle 114 and/or a wire bundle grouping 115 has a generally circular or oblong cross-sectional shape. For example, as shown in FIG. 5, each wire bundle 114 and the wire bundle grouping 115 has a circular cross-sectional shape. According to other implementations, a wire bundle 114 and/or a wire bundle grouping 115 can have a cross-sectional shape other than circular or oblong.

In some examples, the wires 118 of each of at least some of the wire bundles 114 of the electrical raceway system 113 are bundled together systematically based on any of various factors, such as signal type, wire origin, wire destination, common sub-system, and the like. For example, wires 118 transmitting electrical power may be grouped together in a wire bundle 114. According to one example, wires 118 transmitting electrical power or data for operation of a heating, ventilation, and air conditioning (HVAC) sub-system may be grouped together in a wire bundle 114. Some regulations require certain spacing between wire bundles 114 of certain types. Such spacing should be maintained along the length of the wire bundles 114. Similar regulations allow for the aggregation of multiple wire bundles 114 of similar types into a wire bundle grouping 115. The electrical raceway system 113 helps to affix the wire bundles 114 of wires 118 relative to the fuselage 102 and to maintain the regulated spacing between dissimilar wire bundles 114 and facilitates the grouping of similar wire bundles 114 into wire bundle groupings 115 if desired.

In some implementations, a final size of each wire bundle 114 or each wire bundle grouping 115 is difficult to predict. In other words, the size of the wire bundles 114 and/or the wire bundle groupings 115 is known only after the wire bundles 114 and/or wire bundle groupings 115 are put together and ready for installation into the fuselage 102. The electrical raceway system 113 is easily adjustable during assembly of the aircraft 100 to accommodate the unpredictable sizes of the wire bundles 114 wire bundle groupings 115.

The electrical raceway system 113 includes rails 116 non-movably fixed relative to the fuselage 102 via any of various fixation mechanisms, such as fasteners, brackets, welds, etc. The rails 116 are located between the floor 108 and the cargo hold 106 in some implementations. As shown in FIG. 1, the rails 116 are spaced apart from each other in the longitudinal direction 110 or along the length of the fuselage 102. In the illustrated example, when affixed relative to the fuselage 102, each rail 116 is elongated in a lateral direction 112, which is perpendicular to the longitudinal direction 110 and an upright direction 120. The upright direction 120 is also perpendicular to the longitudinal direction 110. The rails 116 are substantially rigid.

Figure 7:
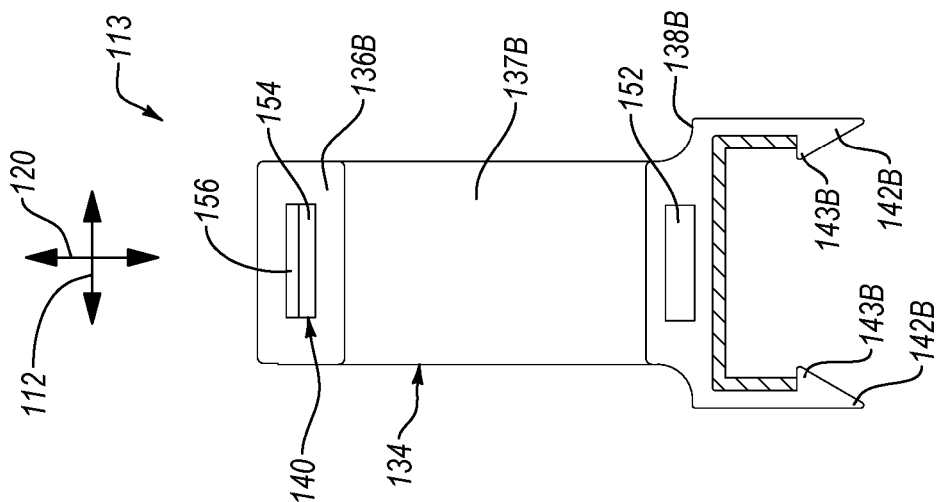
FIG. 7 is a cross-sectional side elevation view of the electrical raceway system of FIG. 3, taken along the line 7-7 of FIG. 3, according to one or more examples of the present disclosure.
Figure 6:
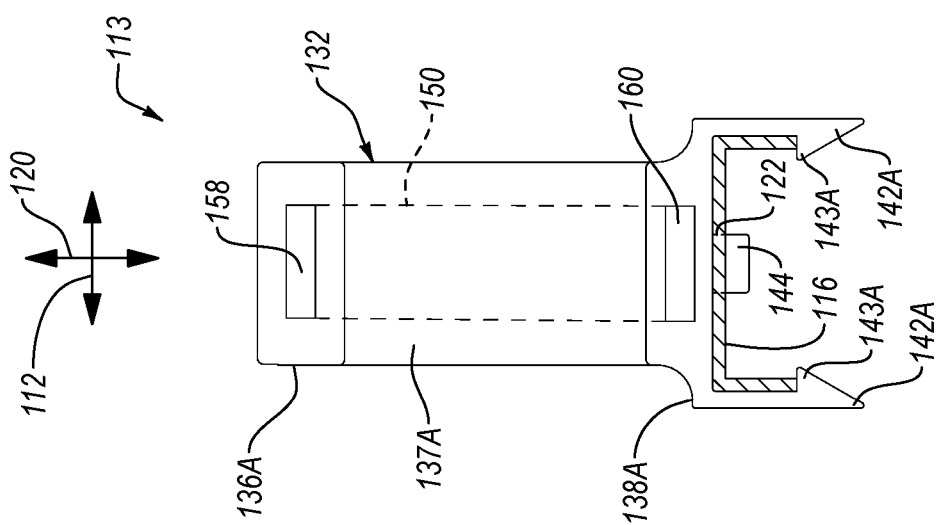
FIG. 6 is a cross-sectional side elevation view of the electrical raceway system of FIG. 3, taken along the line 6-6 of FIG. 3, according to one or more examples of the present disclosure.

Referring to FIGS. 2, 6, and 7, each rail 116 includes a plurality of holes 122 spaced apart along a length of the rail 116. Accordingly, when affixed relative to the fuselage 102, the plurality of holes 122 are spaced apart in the lateral direction 112. In some examples, each hole 122 is spaced an equal distance apart from an adjacent hole 122. The rail 116 can include a bottom wall, in which the holes 122 are formed, and opposing sidewalls extending away from the bottom wall.

The electrical raceway system 113 further includes a plurality of clamp systems 130 each configured to be coupled (e.g., attached) to one of the plurality of rails 116. Each clamp system 130 includes a first clamping component 132 and a second clamping component 134. The first clamping component 132 is configured for fixed attachment to a rail 116. In contrast, the second clamping component 134 is configured for slidable attachment to the rail 116 so that the distance between the first clamping component 132 and the second clamping component 134 is easily adjustable.

Figure 3:
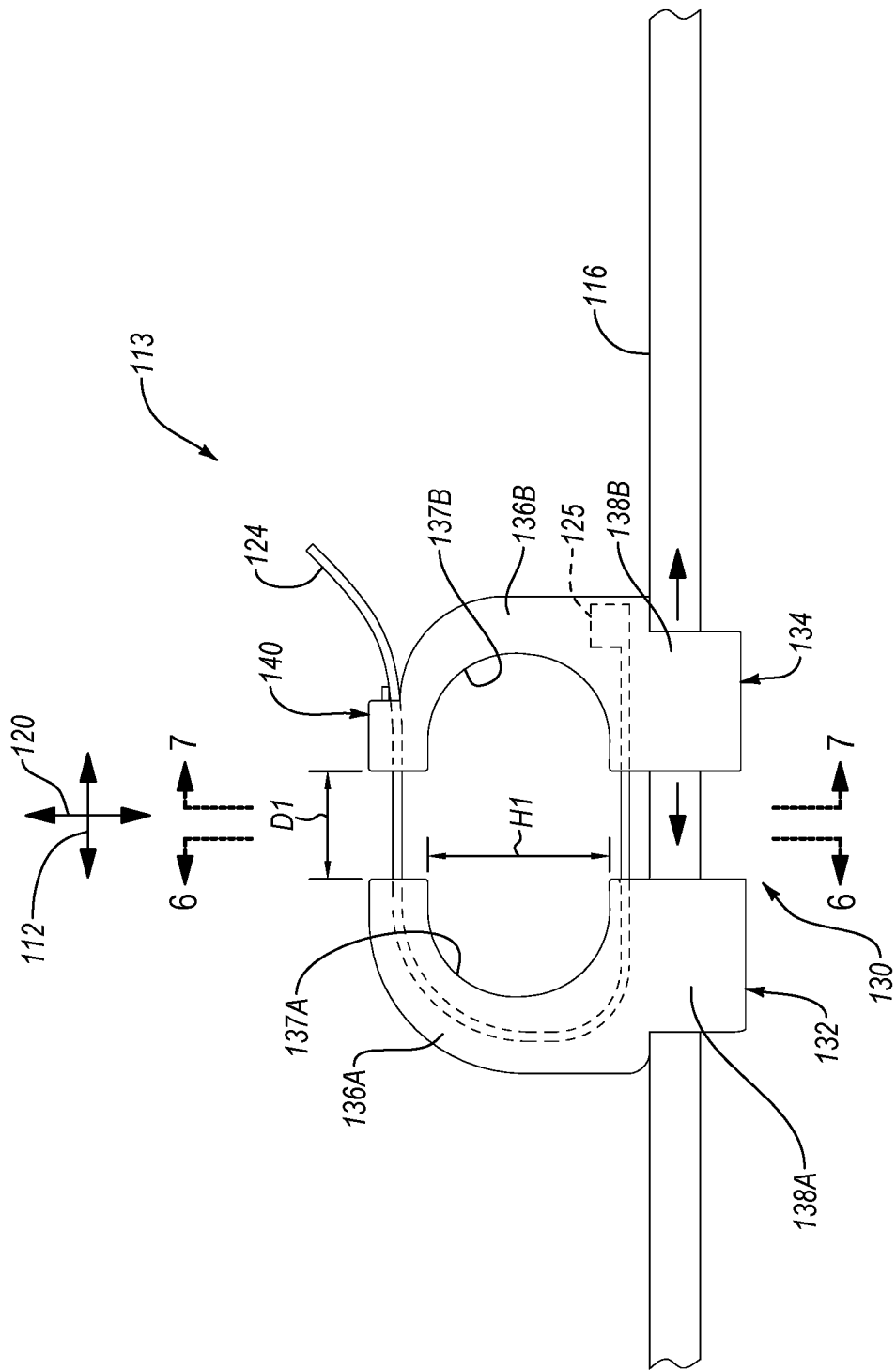
FIG. 3 is a front elevation view of an electrical raceway system, according to one or more examples of the present disclosure.

Referring to FIGS. 3 and 6, the first clamping component 132 comprises a base 138A and a bundle engagement feature 136A fixedly coupled to the base 138A. In one implementation, the base 138A and the bundle engagement feature 136A are co-formed to have a one-piece, unitary, and monolithic construction.

The base 138A facilitates fixed attachment of the first clamping component 132 to the rail 116. For example, the base 138A includes arms 142A (see, e.g., FIG. 6) that are spaced apart from each other such that a gap is defined between the arms 142A. The gap between the arms 142A is large enough to receive a width of the rail 116 therein. The arms 142A further include rail retention features 143A (e.g., tabs, teeth, etc.) at free ends of the arms 142A. The distance between the rail retention features 143A is less than the width of the rail 116, but the length of the arms 142A, minus the length of the rail retention features 143A, is greater than a thickness of the rail 116.

Moreover, the base 138A of the first clamping component 132 can snap-fit partially around the rail 116 to constrain (e.g., prevent) movement of the first clamping component 132 relative to the rail 116 in the upright direction 120. The arms 142A of the base 138A are resiliently flexible away from each other to temporarily increase the distance between the rail retention features 143A. When the arms 142A are resiliently flexed away from each other in this manner, the rail 116 can be moved between the rail retention features 143A and into the gap between the arms 142A. After the rail 116 is moved into the gap between the arms 142A, the arms 142A can be unflexed which causes the rail retention features 143A to engage the rail 116. Engagement between the rail retention features 143A and the rail 116 retains the rail 116 in the gap between the arms 142A and constrains movement of the first clamping component 132 relative to the rail 116 in the upright direction 120. In some examples, the rail retention features 143A include beveled leading edges that, when pressed against the rail 116, help to resiliently flex the rail retention features 143A outwardly to receive the rail 116. Although the base 138A of the illustrated example includes a single pair of arms 142A, in other examples, the base 138A includes multiple pairs of arms 142A. To release the first clamping component 132 from the rail 116, the arms 142A are simply resiliently flexed away from each other while moving the first clamping component 132 away from the rail 116.

Figure 4:
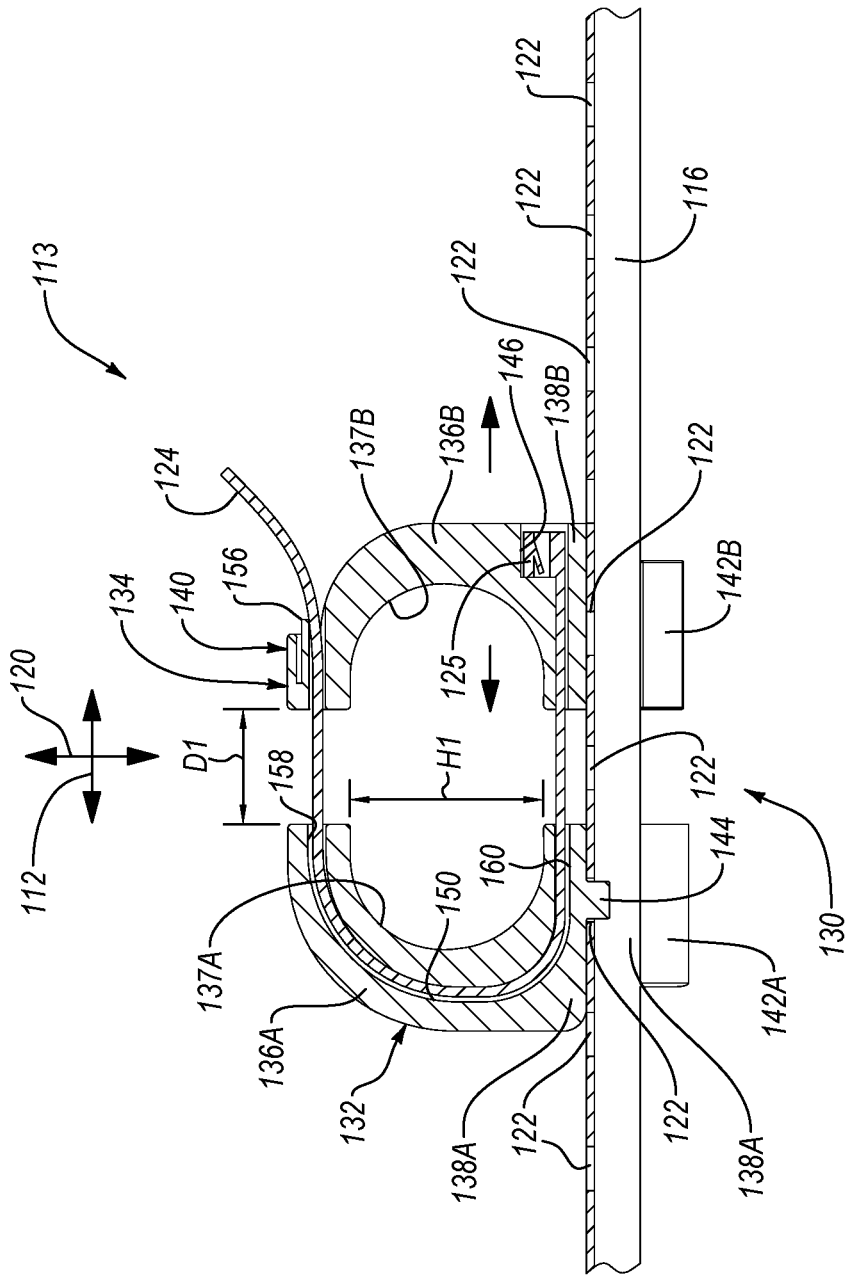
FIG. 4 is a cross-sectional front elevation view of an electrical raceway system, taken along a line similar to the line 4-4 of FIG. 2, according to one or more examples of the present disclosure.

Referring to FIGS. 4 and 6, the base 138A of the first clamping component 132 additionally includes a nub 144 protruding from a side of the base 138A opposite the side from which the bundle engagement feature 136A extends. The nub 144 can be any of variously-sized and shaped protrusions configured to seat within one of the holes 122 in the rail. In other words, in some examples, the nub 144 has a size and shape that complements that of the holes 122. In the illustrated example, the nub 144 has a circular shape and the holes 122 have a circular shape. Generally, when the nub 144 is engaged with a hole 122, the engagement between the nub 144 and the hole 122 prevents movement of the first clamping component 132 relative to the rail 116 (or along the rail) in the lateral direction 112. Because the nub 144 can fit into any one of the holes 122 of the rail 116, the first clamping component 132 can be non-movably fixed at any of various locations along the rail 116.

Moreover, because the first clamping component 132 is releasably fixed to the rail 116, without the use of separate fasteners, the position of the first clamping component along the rail 116 can be quickly and easily adjusted. In particular, if a distance D2 between clamp systems 130 should be adjusted, such as to accommodate spatial regulations, the position of the first clamping component 132 of one or more clamp systems 130 can be adjusted to quickly and easily adjust the distance D2 (see, e.g., FIG. 2). Although the first clamping component 132 of the illustrated example includes one nub 144, in other examples, the first clamping component 132 can have multiple nubs 144 for engaging multiple holes 122 of the rail 116 at one time.

Referring to FIG. 3, the bundle engagement feature 136A of the first clamping component 132 includes a first concave engagement surface 137A. In the illustrated example, the first concave engagement surface 137A is a curved surface with a constant radius of curvature. However, in other examples, the first concave engagement surface 137A may not have a constant radius of curvature or not be a curved surface (e.g., could include a series of flat surfaces that collectively define a concave surface). The concavity of the first concave engagement surface 137A helps to capture and retain a wire bundle 114 and/or wire bundle grouping 115. To further facilitate the capture and retention of a wire bundle 114 and/or wire bundle grouping 115, the concavity of the first concave engagement surface 137A extends at least 90-degrees in some examples such that the bundle engagement feature 136A has at least a partial overhang. The overhang helps to constrain movement of a captured wire bundle 114 and/or wire bundle grouping 115 in the upright direction 120. The first concave engagement surface 137A has a height H1. The concavity and height H1 of the first concave engagement surface 137A corresponds with a desired shape and size of a wire bundle 114 and/or wire bundle grouping 115 to be captured by the first clamping component 132. Referring to FIG. 2, in some implementations, where the electrical raceway system 113 includes multiple clamp systems 130, the first concave engagement surface 137A of one of the clamp systems 130 may have a concavity and/or height H1 that is different than the first concave engagement surface 137A of another of the clamp systems 130 for capturing wire bundles 114 and/or wire bundle grouping 115 having a different shape and/or a different size. For example, the first concave engagement surface 137A of the first clamping components 132 to the right of the illustrated wire bundle 114 is larger than the first clamping components 132 to the left of the illustrated wire bundle 114.

The bundle engagement feature 136A may also have a first convex surface opposing the first concave engagement surface 137A such that the bundle engagement feature 136A has a generally C-shaped cross-section. In some examples, the bundle engagement feature 136A extends across only a portion of the width of the base 138A to promote the resilient flexibility of the arms 142A (see, e.g., FIG. 6). However, in other examples, the bundle engagement feature 136A may extend across the entire width of the base 138A.

In some examples, such as shown in FIG. 3, the first clamping component 132 includes a single bundle engagement feature 136 and thus a single concave engagement surface 137A. However, in other examples, such as shown in FIG. 2, the first clamping component 132 includes two bundle engagement features 136 and thus two concave engagement surfaces 137A, which help to reduce complexity, part count, and weight, among other benefits. The two first concave engagement surfaces 137A on the same first clamping component 132 face opposite directions. As defined herein, the pairing of one second clamping component 134 with one of the two first concave engagement surfaces 137 forms one clamp system 130 and the pairing of another second clamping component 134 with the other of the two first concave engagement surface 137 forms another clamp system 130.

Referring still to FIGS. 3 and 6, the second clamping component 134 comprises a base 138B and a bundle engagement feature 136B fixedly coupled to the base 138B. In one implementation, the base 138B and the bundle engagement feature 136B are co-formed to have a one-piece, unitary, and monolithic construction.

The base 138B facilitates slidable attachment of the second clamping component 132 to the rail 116. For example, the base 138B includes arms 142B (see, e.g., FIG. 7) that are spaced apart from each other such that a gap is defined between the arms 142B. The gap between the arms 142B is large enough to receive a width of the rail 116 therein. The arms 142B further include rail retention features 143B (e.g., tabs, teeth, etc.) at free ends of the arms 142B. The distance between the rail retention features 143B is less than the width of the rail 116, but the length of the arms 142B, minus the length of the rail retention features 143B, is greater than a thickness of the rail 116.

Moreover, the base 138B of the second clamping component 134 can snap-fit partially around the rail 116 to constrain (e.g., prevent) movement of the second clamping component 134 relative to the rail 116 in the upright direction 120. The arms 142B of the base 138B are resiliently flexible away from each other to temporarily increase the distance between the rail retention features 143B. When the arms 142B are resiliently flexed away from each other in this manner, the rail 116 can be moved between the rail retention features 143B and into the gap between the arms 142B. After the rail 116 is moved into the gap between the arms 142B, the arms 142B can be unflexed which causes the rail retention features 143B to engage the rail 116. Engagement between the rail retention features 143B and the rail 116 retains the rail 116 in the gap between the arms 142B and constrains movement of the second clamping component 134 relative to the rail 116 in the upright direction 120. In some examples, the rail retention features 143B include beveled leading edges that, when pressed against the rail 116, help to resiliently flex the rail retention features 143B outwardly to receive the rail 116. Although the base 138B of the illustrated example includes a single pair of arms 142B, in other examples, the base 138B includes multiple pairs of arms 142B. To release the second clamping component 134 from the rail 116, the arms 142B are simply resiliently flexed away from each other while moving the second clamping component 134 away from the rail 116.

Unlike the first clamping component 132, the base 138B of the second clamping component 134 does not include a nub 144. Accordingly, the base 138B of the second clamping component 134 does not engage the holes 122 of the rail 116, which allows the second clamping component 134 to freely slide along the rail, unless constrained from slidable movement by a flexible retention strap 124.

Referring to FIG. 3, the bundle engagement feature 136B of the second clamping component 134 includes a second concave engagement surface 137B. In the illustrated example, the second concave engagement surface 137B is a curved surface with a constant radius of curvature. However, in other examples, the second concave engagement surface 137B may not have a constant radius of curvature or not be a curved surface (e.g., could include a series of flat surfaces that collectively define a concave surface). The concavity of the second concave engagement surface 137B helps to capture and retain a wire bundle 114 and/or wire bundle grouping 115. To further facilitate the capture and retention of a wire bundle 114 and/or wire bundle grouping 115, the concavity of the second concave engagement surface 137B extends at least 90-degrees in some examples such that the bundle engagement feature 136B has at least a partial overhang. The overhang helps to constrain movement of a captured wire bundle 114 and/or wire bundle grouping 115 in the upright direction 120. The second concave engagement surface 137B has a height H1. The concavity and height H1 of the second concave engagement surface 137B corresponds with a desired shape and size of a wire bundle 114 and/or wire bundle grouping 115 to be captured by the second clamping component 134. Referring to FIG. 2, in some implementations, where the electrical raceway system 113 includes multiple clamp systems 130, the second concave engagement surface 137B of one of the clamp systems 130 may have a concavity and/or height H1 that is different than the second concave engagement surface 137B of another of the clamp systems 130 for capturing wire bundles 114 and/or wire bundle groupings 115 having a different shape and/or a different size. For example, the second concave engagement surface 137B of the second clamping components 134 to the right of the illustrated wire bundle 114 is larger than the second clamping components 134 to the left of the illustrated wire bundle 114.

The bundle engagement feature 136B may also have a first convex surface opposing the second concave engagement surface 137B such that the bundle engagement feature 136B has a generally C-shaped cross-section. In some examples, the bundle engagement feature 136B extends across only a portion of the width of the base 138B to promote the resilient flexibility of the arms 142B (see, e.g., FIG. 7). However, in other examples, the bundle engagement feature 136B may extend across the entire width of the base 138B.

The first clamping component 132 and the second clamping component 134 of a clamp system 130 are attached to the rail 116 such that the first concave engagement surface 137A and the second concave engagement surface 137B oppose and face each other. A wire bundle capture space is defined between the first concave engagement surface 137A and the second concave engagement surface 137B. A size of the wire bundle capture space is adjustable by adjusting the distance D1 between the first concave engagement surface 137A and the second concave engagement surface 137B. The distance D1 is adjustable by sliding the second clamping component 134 along the rail 116 while the first clamping component 132 is fixed to the rail 116. When the distance D1 corresponds with an acceptable capture of a wire bundle 114 and/or wire bundle grouping 115 between the first concave engagement surface 137A and the second concave engagement surface 137B, the distance D1 is fixed by constraining movement of the second clamping component 134 away from the first clamping component 132 with a retention device, such as a retention strap 124, intercoupling the first clamping component 132 and the second clamping component 134.

Intercoupling of the first clamping component 132 and the second clamping component 134 with a retention device is aided by retention features of the first clamping component 132 and the second clamping component 134. Referring to FIG. 3, the retention features help to secure a retention device to the first clamping component 132 and the second clamping component 134 such that the second clamping component 134 does not slide relative to the first clamping component 132 and a wire bundle 114 and/or wire bundle grouping 115 is securely captured between the first concave engagement surface 137A and the second concave engagement surface 137B. In the illustrated example, the retention device is a retention strap 124 and the retention features of the first clamping component 132 and the second clamping component 134 are holes, channels, grooves, and the like that retain the retention strap 124 and promote at least partial circumscribing of the wire bundle 114 by the retention strap 124. In other words, in some examples, the retention strap 124 at least partially wraps around the wire bundle 114 and/or wire bundle grouping 115 in addition to intercoupling together the first clamping component 132 and the second clamping component 134. As shown in FIG. 5, the wire bundles 114 and the wire bundle grouping 115 are fully circumscribed (e.g., circumferentially enclosed by) a combination of the first concave engagement surface 137A, the second concave engagement surface 137B, and the retention strap 124.

The retention features of the first clamping component 132 includes a first aperture 158 and a second aperture 160 where the first concave engagement surface 137A is between the first aperture 158 and the second aperture 160. Similarly, the retention features of the second clamping component 134 includes a first aperture 152 and a second aperture 154 where the second concave engagement surface 137B is between the first aperture 152 and the second aperture 154. Each of the first aperture 158 and the second aperture 160 of the first clamping component 132 and each of the first aperture 152 and the second aperture 154 of the second clamping component 134 is sized and shaped to allow the retention strap 124 to pass therethrough. As shown in FIG. 4, the retention strap 124 can be looped through the first aperture 158 and the second aperture 160 of the first clamping component 132 and each of the first aperture 152 and the second aperture 154 of the second clamping component 134 to intercouple together the first clamping component 132 and the second clamping component 134, as well as wrap around a wire bundle 114 between the first concave engagement surface 137A, the second concave engagement surface 137B.

Figure 8:
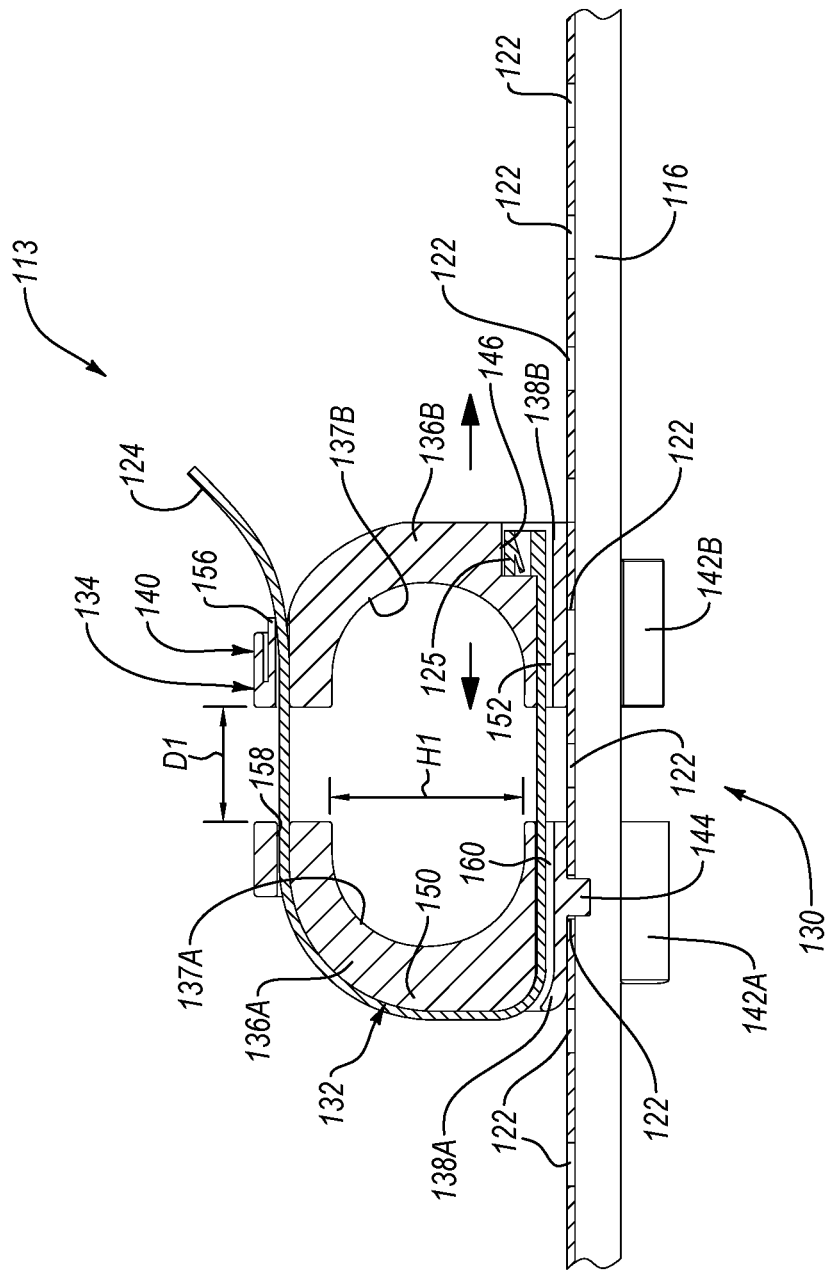
FIG. 8 is a cross-sectional front elevation view of an electrical raceway system, taken along a line similar to the line 4-4 of FIG. 2, according to one or more examples of the present disclosure.

In one example shown in FIG. 4, the retention features of the first clamping component 132 also include a through-channel 150 formed through the bundle engagement feature 136A. The through-channel 150 intercouples the first aperture 158 and the second aperture 160. In this manner, the retention strap 124 can pass interiorly along the bundle engagement feature 136A. However, in another example shown in FIG. 8, the first clamping component 132 does not includes a through-channel 150 and the retention strap 124 extends exteriorly around an outer surface of the bundle engagement feature 136A between the first aperture 158 and the second aperture 160.

In some examples, the retention strap 124 includes a series of teeth configured to be engaged by a movable pawl of a ratcheting system. The ratcheting system further includes a circumferentially closed housing that maintains the teeth in engagement with the pawl. Generally, the pawl allows movement of the strap 124 relative to the pawl in one direction, but engages the teeth to prevent movement of the strap 124 relative to the pawl in the opposite direction. The pawl can be disengaged to allow movement of the strap 124 in both directions, such as to release the retention strap 124 from the pawl if desired. In an example, the retention strap 124 is a conventional zip-tie or panduit strap. The pawl can be integrated into the retention strap 124 such that the retention strap 124 can form an enclosed loop when engaged with the pawl. The enclosed loop can be tightened by pulling the retention strap 124 through the pawl. The tension in the retention strap 124 is maintained by virtue of the pawl engaging the teeth of the retention strap 124 and preventing the retention strap 124 from reversing through the pawl.

According to an example shown in FIG. 4, the second clamping component 132 includes a ratcheting mechanism 140, including a pawl 156, integrated into (e.g., permanently fixed to, built into, etc.) the second clamping component 132. In such an example, the second clamping component 132 may also include a pocket 146 (e.g., recess) for seatably receiving a ratcheting mechanism built into the retention strap 124. When received in the pocket 146, the pocket 146 acts as a stop to restrain the ratcheting mechanism of the retention strap 124 by preventing further movement of the ratcheting mechanism. The retention strap 124 can then be looped through the apertures or channels of the first clamping component 132 and the second clamping component 134 before being passed through the ratcheting mechanism 140 to securely tighten the retention strap 124.

Figure 9:
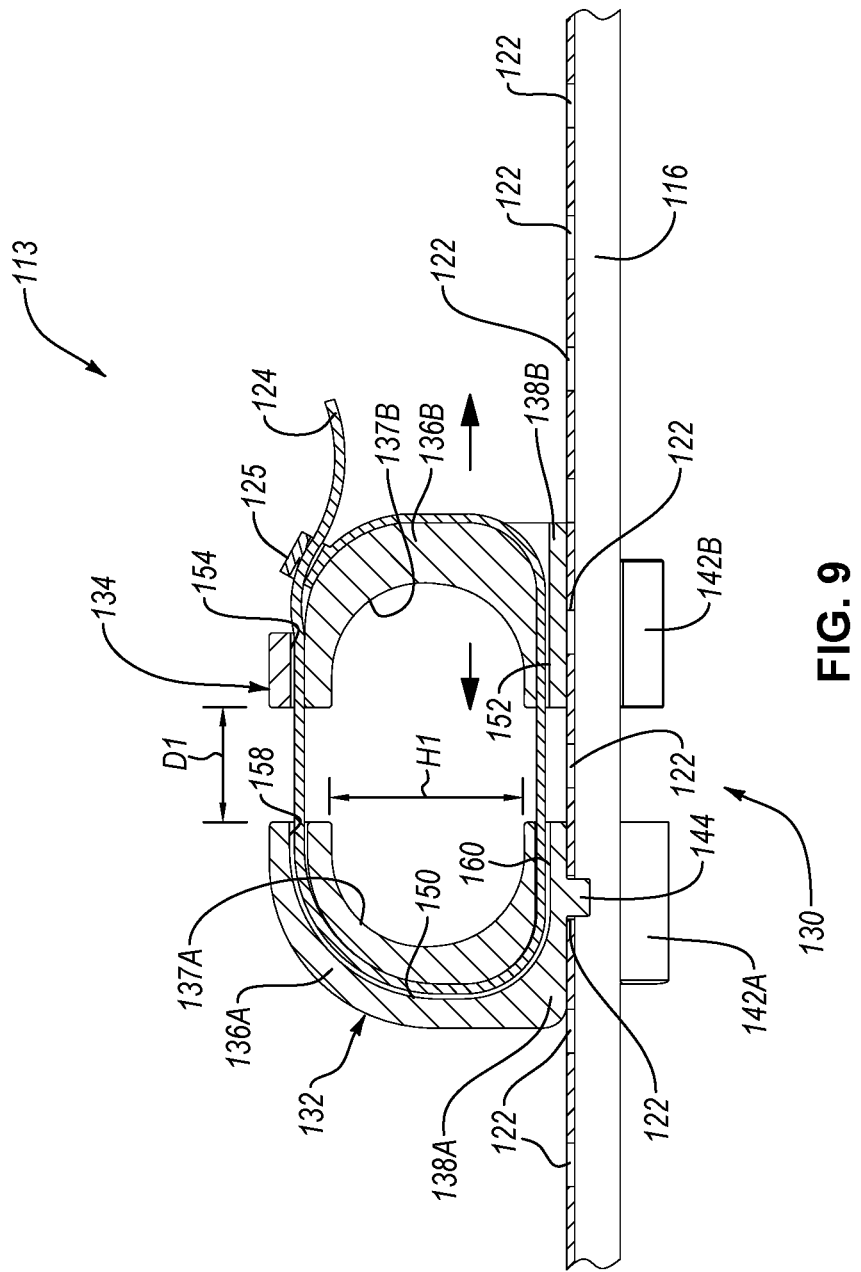
FIG. 9 is a cross-sectional front elevation view of an electrical raceway system, taken along a line similar to the line 4-4 of FIG. 2, according to one or more examples of the present disclosure.

In another example, shown in FIG. 9, the clamp system 130 does not include an integrated ratcheting mechanism 140. Rather, the ratcheting mechanism of the retention strap 124 is used to securely tighten the retention strap 124 by looping the retention strap 124 through its ratcheting mechanism.

Although some retention features, such as the ratcheting mechanism 140, the pocket 146, and the through-channel 150 are shown forming part of the second clamping component 134, it is recognized that one or more of the ratcheting mechanism 140, the pocket 146, and the through-channel 150 can be formed in the first clamping component 132 instead of the second clamping component 134.

Figure 10:
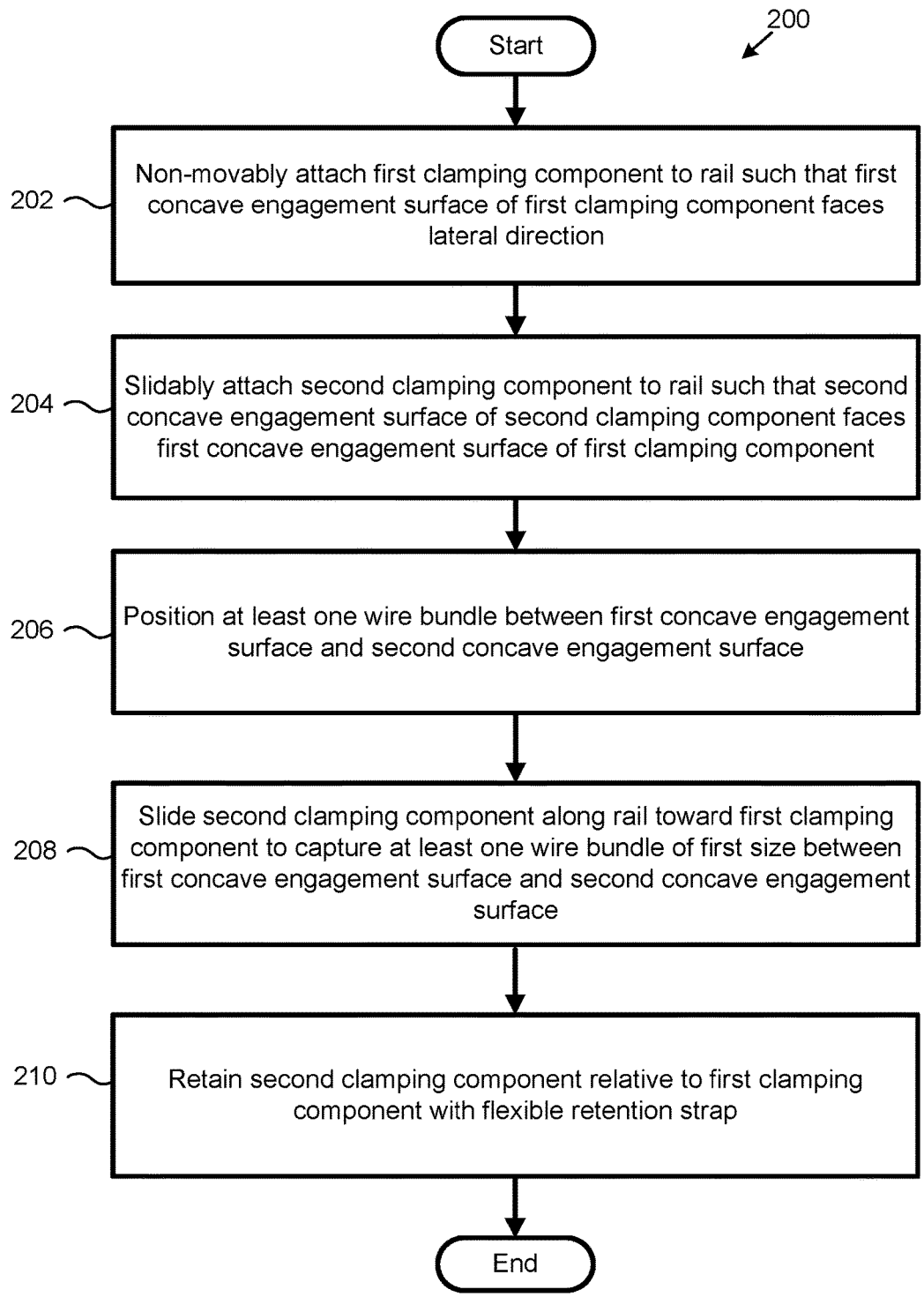
FIG. 10 is a schematic flow chart of a method of affixing a wire bundle to a rail, according to one or more examples of the present disclosure.

Referring to FIG. 10, according to one example, a method 200 of affixing a wire bundle 114 and/or wire bundle grouping 115 to the rail 116 is shown. Because the method 200 can be used to affix one wire bundle 114 or multiple wire bundles 114 (in the form of a wire bundle grouping 115), the method 200 is hereinafter described as a method 200 of affixing at least one wire bundle 114. As defined herein, at least one wire bundle 114 can be one wire bundle 114 or a wire bundle grouping 115 of multiple wire bundles 114. The at least one wire bundle 114 is elongated in the longitudinal direction 110 and the rail is elongated in the lateral direction 112. The method 200 includes non-movably attaching the first clamping component 132 to the rail 116 such that the first concave engagement surface 137A of the first clamping component 132 faces the lateral direction 112 at step 202. The method 200 additionally includes slidably attaching the second clamping component 134 to the rail 116 such that the second concave engagement surface 137B of the second clamping component 134 faces the first concave engagement surface 137A of the first clamping component 132 at step 204. The method 200 further includes positioning the at least one wire bundle 114 between the first concave engagement surface 137A and the second concave engagement surface 137B at step 206. With the at least one wire bundle 114 between the first concave engagement surface 137A and the second concave engagement surface 137B, the method 200 also includes sliding the second clamping component 134 along the rail 116 toward the first clamping component 132 to capture the at least one wire bundle 114 of the first size between the first concave engagement surface 137A and the second concave engagement surface 137B at step 208. The method 200 additionally includes retaining the second clamping component 134 relative to the first clamping component 132 with the flexible retention strap 124 at step 210.

In some implementations, the at least one wire bundle 114 has a first size and the method 200 further includes removing the at least one wire bundle 114 of the first size from between the first concave engagement surface 137A and the second concave engagement surface 137B, positioning at least one wire bundle 114 of a second size, different than the first size, between the first concave engagement surface 137A and the second concave engagement surface 137B, and with the at least one wire bundle 114 of the second size between the first concave engagement surface 137A and the second concave engagement surface 137B, sliding the second clamping component 134 along the rail 116 toward the first clamping component 132 to capture the at least one wire bundle 114 of the second size between the first concave engagement surface 137A and the second concave engagement surface 137B.

In certain implementations, the at least one wire bundle 114 includes a plurality of wire bundles 114 and the method 200 further includes removing at least one of the plurality of wire bundles 114 (but not all of the plurality of wire bundles 114) from between the first concave engagement surface 137A and the second concave engagement surface 137B, sliding the second clamping component 134 along the rail 116 toward the first clamping component 132 to capture the plurality of wire bundles 114 less the at least one removed wire bundle 114 between the first concave engagement surface 137A and the second concave engagement surface 137B. Alternatively, instead of an entire wire bundle 114 being removed, in some implementations, a single wire 118 or less than all the wires 118 of a wire bundle 114 can be removed.

According to certain implementations, the method 200 further includes adding at least one additional wire bundle 114 to the at least one wire bundle 114 between the first concave engagement surface 137A and the second concave engagement surface 137B, sliding the second clamping component 134 along the rail 116 initially away from and then toward the first clamping component 132 to capture the at least one wire bundle 114 and the at least one additional wire bundle 114 between the first concave engagement surface 137A and the second concave engagement surface 137B. Alternatively, instead of an entire wire bundle 114 being added, in some implementations, a single wire 118 or a plurality or wires 118 not arranged in a wire bundle 114 can be added.

Although an aircraft 100 is shown, the electrical raceway system 113 may be implemented in other mobile vehicles or non-mobile structures where wires are bundled together and organized relative to other bundles.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A clamp system for affixing a wire bundle, having any one of various sizes, to a rail elongated in a lateral direction, the clamp system comprising:
   a first clamping component comprising a first concave engagement surface and configured for fixed attachment to the rail; and
   a second clamping component comprising a second concave engagement surface and configured for slidable attachment to the rail; and
   wherein:
      when the first clamping component and the second clamping component are attached to the rail, the first concave engagement surface and the second concave engagement surface oppose and face each other to enable capture of the wire bundle therebetween and a distance between the first concave engagement surface and the second concave engagement surface is adjustable;
      the rail comprises holes, spaced apart from one another in the lateral direction; and
      the first clamping component comprises a nub, engageable with a corresponding one of the holes to prevent movement of the first clamping component relative to the rail in the lateral direction.

2. The clamp system according to claim 1, wherein the first clamping component comprises arms spaced apart from each other and configured to releasably engage the rail therebetween to constrain movement of the first clamping component relative to the rail in an upright direction perpendicular to the lateral direction.

3. The clamp system according to claim 1, wherein:
slidable attachment of the second clamping component to the rail promotes sliding of the second clamping component along the rail in the lateral direction; and
the second clamping component comprises arms spaced apart from each other and configured to releasably engage the rail therebetween to constrain movement of the second clamping component relative to the rail in an upright direction perpendicular to the lateral direction.

4. The clamp system according to claim 1, wherein the first clamping component comprises two first concave engagement surfaces facing in opposite directions.

5. The clamp system according to claim 1, further comprising a flexible retention strap engageable with the first clamping component, the second clamping component, and the wire bundle to at least partially affix the wire bundle to the first clamping component and the second clamping component.

6. The clamp system according to claim 5, wherein engagement between the flexible retention strap and the first clamping component and the second clamping component constrains movement of the second clamping component away from the first clamping component in the lateral direction.

7. The clamp system according to claim 5, wherein:
one of the first clamping component or the second clamping component comprises a ratcheting mechanism integrated into the one of the first clamping component or the second clamping component; and
the ratcheting mechanism is configured to engage the flexible retention strap and allow motion of the flexible retention strap through the ratcheting mechanism in only one direction.

8. The clamp system according to claim 5, wherein:
the first clamping component comprises at least two first-clamping-component apertures through which the flexible retention strap is extendable to couple the flexible retention strap to the first clamping component; and
the second clamping component comprises at least two second-clamping-component apertures through which the flexible retention strap is extendable to couple the flexible retention strap to the second clamping component.

9. The clamp system according to claim 8, wherein the first clamping component further comprises a through-channel formed in the first clamping component and intercoupling the at least two first-clamping-component apertures.

10. The clamp system according to claim 8, wherein one of the at least two first-clamping-component apertures and the at least two second-clamping-component apertures comprises a pocket configured to complementary engage a ratcheting mechanism of the flexible retention strap.

11. An electrical raceway system, comprising:
a plurality of rails elongated in a lateral direction;
a plurality of wire bundles, each comprising a plurality of wires, elongated in a longitudinal direction perpendicular to the lateral direction; and
a plurality of clamp systems, each comprising:
a first clamping component non-movably attached to a corresponding one of the plurality of rails and comprising a first concave engagement surface;
a second clamping component slidably attached to the corresponding one of the plurality of rails and comprising a second concave engagement surface opposing and facing the first concave engagement surface, wherein the second clamping component is slidable along the corresponding one of the plurality of rails in the lateral direction and a corresponding one of the wire bundles is captured between the first concave engagement surface and the second concave engagement surface; and
a flexible retention strap engaged with the first clamping component, the second clamping component, and the corresponding one of the wire bundles to at least partially affix the corresponding one of the wire bundles to the first clamping component and the second clamping component and to constrain movement of the second clamping component away from the first clamping component in the lateral direction.

12. The electrical raceway system according to claim 11, wherein:
each of the plurality of clamp systems captures a corresponding one of the plurality of wire bundles; and
individual ones of the plurality of wire bundles are spaced apart from one another in the lateral direction.

13. The electrical raceway system according to claim 12, wherein the first concave engagement surface and the second concave engagement surface of one of the plurality of clamp systems and of another one of the plurality of clamp systems are different in size.

14. The electrical raceway system according to claim 12, wherein:
the first clamping component of one of the plurality of clamp systems and the first clamping component of an adjacent one of the plurality of clamp systems are integrated together to form a one-piece monolithic construction; and
the first concave engagement surface of the first clamping component of the one of the plurality of clamp systems faces in a direction opposite that in which the first concave engagement surface of the first clamping component of the adjacent one of the plurality of clamp systems faces.

15. The electrical raceway system according to claim 11, wherein:
each of the plurality of rails comprises holes spaced apart from one another in the lateral direction; and
the first clamping component comprises a nub engaged with a corresponding one of the holes to prevent movement of the first clamping component relative to a corresponding one of the plurality of rails in the lateral direction.

16. The electrical raceway system according to claim 11, wherein:
individual ones of the plurality of rails are spaced apart from one another in the longitudinal direction;
each of the plurality of clamp systems is attached to a corresponding one of the plurality of rails; and
a corresponding one of the plurality of wire bundles is captured between the first concave engagement surface and the second concave engagement surface of each of the plurality of clamp systems.

17. The electrical raceway system according to claim 11, wherein the electrical raceway system is configured for coupling to an aircraft between a floor of a passenger cabin of the aircraft and a cargo hold of the aircraft.

18. A method of affixing a wire bundle, elongated in a longitudinal direction, to a rail, elongated in a lateral direction, the method comprising:
- non-movably attaching a first clamping component to the rail such that a first concave engagement surface of the first clamping component faces the lateral direction;
- slidably attaching a second clamping component to the rail such that a second concave engagement surface of the second clamping component faces the first concave engagement surface of the first clamping component;
- positioning the wire bundle of a first size between the first concave engagement surface and the second concave engagement surface;
- with the wire bundle of the first size between the first concave engagement surface and the second concave engagement surface, sliding the second clamping component along the rail toward the first clamping component to capture the wire bundle of the first size between the first concave engagement surface and the second concave engagement surface; and
- retaining the second clamping component relative to the first clamping component with a flexible retention strap.

19. The method according to claim 18, further comprising:
- removing the wire bundle of the first size from between the first concave engagement surface and the second concave engagement surface;
- positioning a second wire bundle of a second size, different than the first size, between the first concave engagement surface and the second concave engagement surface; and
- with the second wire bundle of the second size between the first concave engagement surface and the second concave engagement surface, sliding the second clamping component along the rail toward the first clamping component to capture the second wire bundle of the second size between the first concave engagement surface and the second concave engagement surface.

20. The method according to claim 18, wherein:
the wire bundle is a plurality of wire bundles; and
the method further comprises:
- removing at least one of the plurality of wire bundles, but less than all of the plurality of wire bundles, from between the first concave engagement surface and the second concave engagement surface; and
- sliding the second clamping component along the rail toward the first clamping component to capture those of the plurality of wire bundles remaining after at least the one of the plurality of wire bundles, but less than all of the plurality of wire bundles, is removed from between the first concave engagement surface and the second concave engagement surface.

21. The method according to claim 18, further comprising:
- adding an additional wire bundle to the wire bundle between the first concave engagement surface and the second concave engagement surface; and
- sliding the second clamping component along the rail initially away from and then toward the first clamping component to capture the wire bundle and the additional wire bundle between the first concave engagement surface and the second concave engagement surface.

* * * * *